(12) United States Patent
Kraenzle

(10) Patent No.: US 7,651,141 B2
(45) Date of Patent: *Jan. 26, 2010

(54) TAILGATE LATCHING MECHANISMS

(76) Inventor: David G. Kraenzle, 12845 Big Bend, St. Louis, MO (US) 63122

( * ) Notice: Subject to any disclaimer, the term of this patent is extended or adjusted under 35 U.S.C. 154(b) by 0 days.

This patent is subject to a terminal disclaimer.

(21) Appl. No.: 11/935,782

(22) Filed: Nov. 6, 2007

(65) Prior Publication Data

US 2008/0054653 A1    Mar. 6, 2008

Related U.S. Application Data

(63) Continuation of application No. 11/249,562, filed on Oct. 13, 2005, now Pat. No. 7,303,218.

(60) Provisional application No. 60/706,991, filed on Aug. 10, 2005.

(51) Int. Cl.
*E05B 15/02* (2006.01)
(52) U.S. Cl. .............................. 292/341.17; 292/341.15
(58) Field of Classification Search .......... 292/DIG. 72, 292/341.15, 341.16, 341.17
See application file for complete search history.

(56) References Cited

U.S. PATENT DOCUMENTS

| 321,964 | A | | 7/1885 | Griffin | 292/136 |
|---|---|---|---|---|---|
| 1,126,133 | A | | 1/1915 | Urbanides | |
| 1,173,399 | A | | 2/1916 | Orden | |
| 2,048,334 | A | | 7/1936 | Gredell | |
| 2,288,926 | A | * | 7/1942 | Strader | 292/99 |
| 2,379,613 | A | | 7/1945 | Thiele | |
| 2,476,332 | A | | 7/1949 | Tierney et al. | |
| 2,476,333 | A | | 7/1949 | Tierney et al. | |
| 2,742,309 | A | | 4/1956 | Hillgren | |

(Continued)

*Primary Examiner*—Gary Estremsky

(57) ABSTRACT

An apparatus generally includes a latch and a keeper. The latch has a latching surface and is movable between at least a closed position and an opened position. The keeper has a keeper surface configured for engagement with the latching surface. The latch is movably coupled to supporting structure relative to the latching surface such that the moment created by a load applied to the latching surface while engaged with the keeper surface biases the latch towards the closed position.

51 Claims, 14 Drawing Sheets

U.S. PATENT DOCUMENTS

| | | | |
|---|---|---|---|
| 2,926,942 A | 3/1960 | Krause et al. | 292/11 |
| 3,065,985 A | 11/1962 | Du Four | |
| 3,212,803 A | 10/1965 | Russell et al. | |
| 3,328,063 A | 6/1967 | Ferrante | 292/136 |
| 4,040,654 A | 8/1977 | Hill et al. | |
| 4,094,562 A | 6/1978 | Wilhelmsen | |
| 4,358,150 A | 11/1982 | Nash | |
| 4,529,351 A * | 7/1985 | Olins | 414/545 |
| 4,678,212 A | 7/1987 | Rubio | |
| 4,691,956 A * | 9/1987 | Hodge | 296/51 |
| 4,826,348 A | 5/1989 | Brightman | |
| 4,848,810 A | 7/1989 | Gosse et al. | |
| 4,981,320 A | 1/1991 | Bowman | |
| 5,000,496 A | 3/1991 | Miskech et al. | |
| 5,052,729 A | 10/1991 | Huber | |
| 5,172,945 A * | 12/1992 | Doherty et al. | 292/49 |
| 5,265,450 A | 11/1993 | Doyle | |
| 5,295,720 A * | 3/1994 | Budde | 292/201 |
| 5,451,089 A | 9/1995 | Bender | |
| 5,518,286 A | 5/1996 | McCormack | |
| 5,605,367 A | 2/1997 | McCormack | |
| 5,707,095 A | 1/1998 | Pribak et al. | |
| 5,725,260 A | 3/1998 | Elkmeier et al. | |
| 5,868,478 A | 2/1999 | Yemini | |
| 5,897,148 A | 4/1999 | Arabia, Jr. et al. | |
| 5,947,540 A | 9/1999 | Pariseau et al. | |
| 6,055,700 A * | 5/2000 | Holsten et al. | 15/327.2 |
| 6,085,558 A | 7/2000 | Strathmann | |
| 6,474,118 B2 | 11/2002 | Martinez | |
| 6,550,838 B2 * | 4/2003 | Bobbitt et al. | 296/52 |
| 2004/0026950 A1 | 2/2004 | Zagaroff | |

* cited by examiner

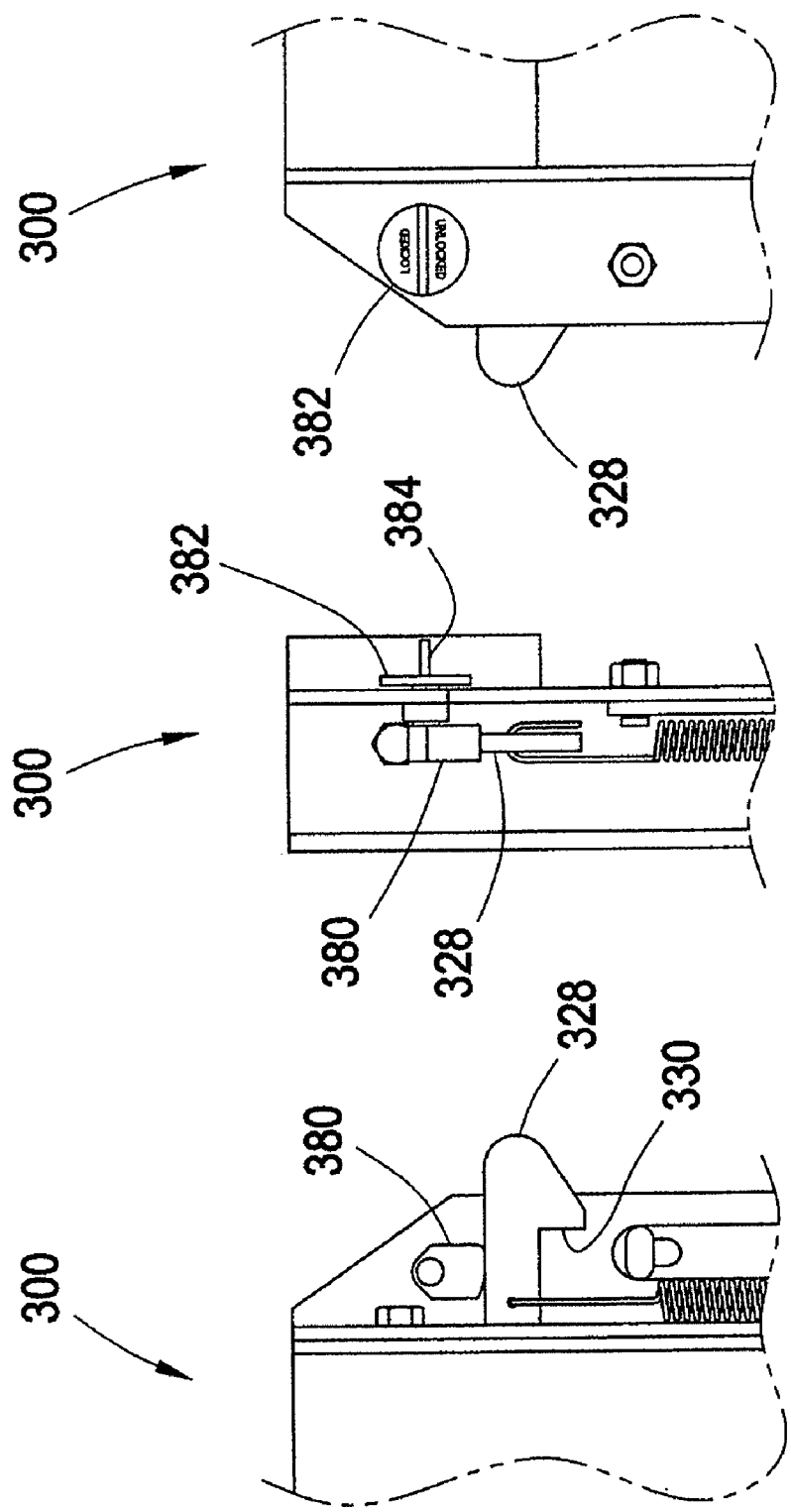

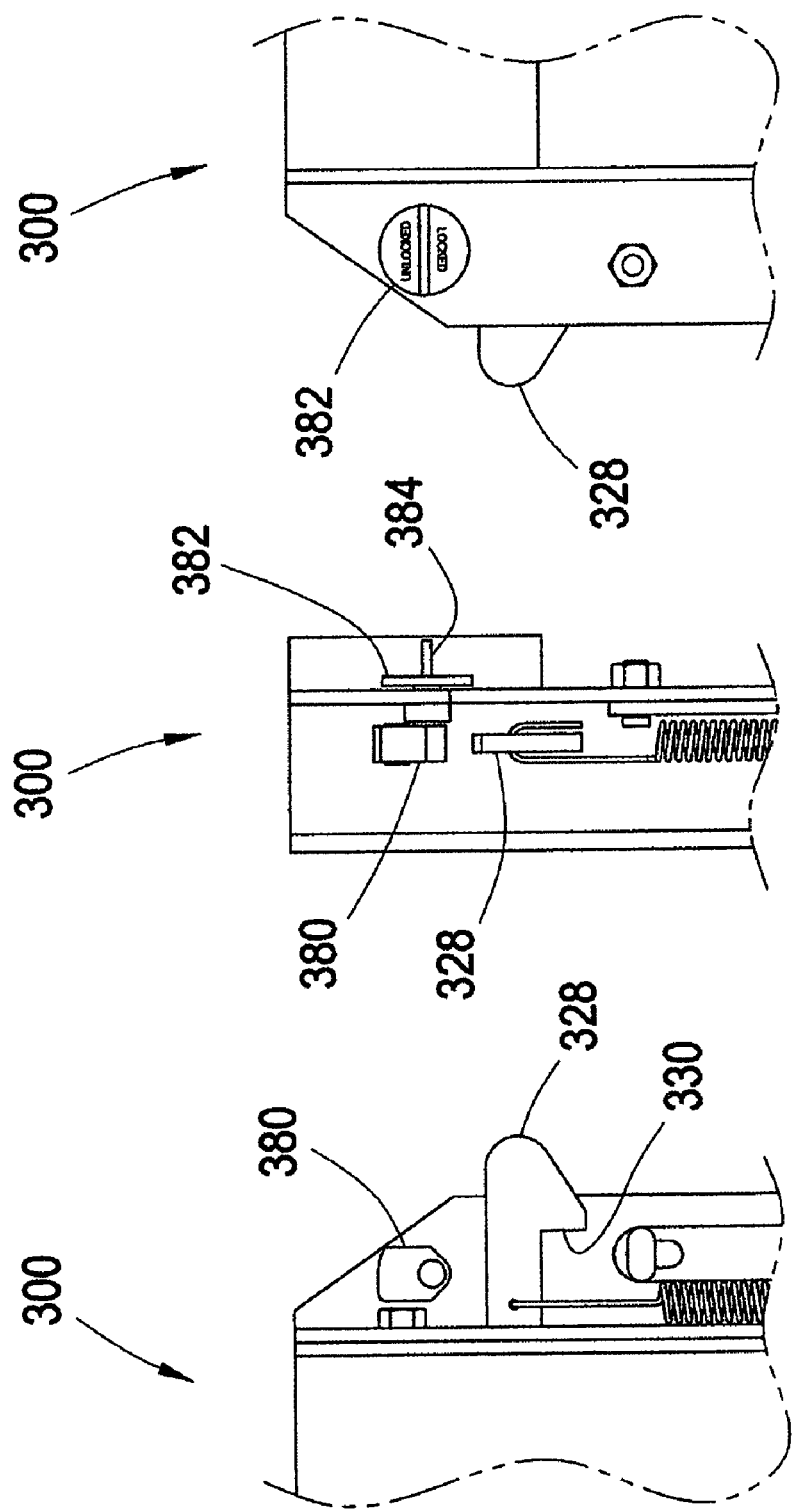

TAILGATE LATCHING MECHANISMS

CROSS-REFERENCE TO RELATED APPLICATIONS

This application is a continuation of allowed U.S. patent application Ser. No. 11/249,562 filed Oct. 13, 2005, which, in turn, claims the benefit of U.S. Provisional Application No. 60/706,991 filed Aug. 10, 2005. The disclosures of the above applications are incorporated herein by reference.

FIELD

The present invention generally relates to tailgate latching mechanisms.

BACKGROUND

The statements in this section merely provide background information related to the present disclosure and may not constitute prior art.

People commonly drive pickup trucks and other vehicles that have tailgates. Usually, the tailgate includes a latching mechanism for latching the tailgate to the vehicle. The latching mechanism should prevent the tailgate from opening on its own, such as due to the impact of a shifting load against the tailgate. Tailgates may also have a lock for preventing someone from opening the tailgate.

SUMMARY

According to one aspect, an apparatus generally includes a latch and a keeper. The latch has a latching surface and is movable between at least a closed position and an opened position. The keeper has a keeper surface configured for engagement with the latching surface. The latch is movably coupled to supporting structure relative to the latching surface such that the moment created by a load applied to the latching surface while engaged with the keeper surface biases the latch towards the closed position.

Further aspects and features of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 13A, 13B, 13C are respective inside, rear, and outside views of another embodiment of a tailgate latching mechanism having a stop for inhibiting pivoting movement of the latch; and FIGS. 14A, 14B, and 14C are respective inside, rear, and outside views of the tailgate latching mechanism shown in FIG. 13 and illustrating the stop in a position in which the stop does not interfere with the pivotal movement of the latch.

Corresponding reference numerals indicate corresponding features throughout the several views of the drawings.

DETAILED DESCRIPTION OF EXEMPLARY EMBODIMENTS

The following description of various embodiments is merely exemplary in nature and is in no way intended to limit the invention, its applications, or uses.

FIGS. 1 through 10 illustrate one embodiment of a tailgate latching mechanism 100 that can be used to latch a tailgate 102 to a vehicle's supporting structure 104. While the illustrated embodiments depict the latching mechanism 100 being used with a tailgate of a pickup truck, aspects of the invention are not so limited, as embodiments of the latching mechanism can be relatively easily adapted for a wide range of vehicles having tailgates, including pickup trucks, large commercial-type trucks, station wagons, hatchbacks, among other vehicles. Accordingly, the specific references to tailgates or trucks herein should not be construed as limiting the scope of the present invention to any specific form/type of vehicle.

The description of the tailgate 102 and its mounting arrangement to the vehicle supporting structure 104 is provided for purposes of illustration only and not for purposes of limitation, as aspects of the invention can be used with a wide range of other tailgates and doors. Accordingly, aspects of the invention should not be limited to use with any specific form/type of tailgate or be limited to use with just tailgates.

Figure 1:
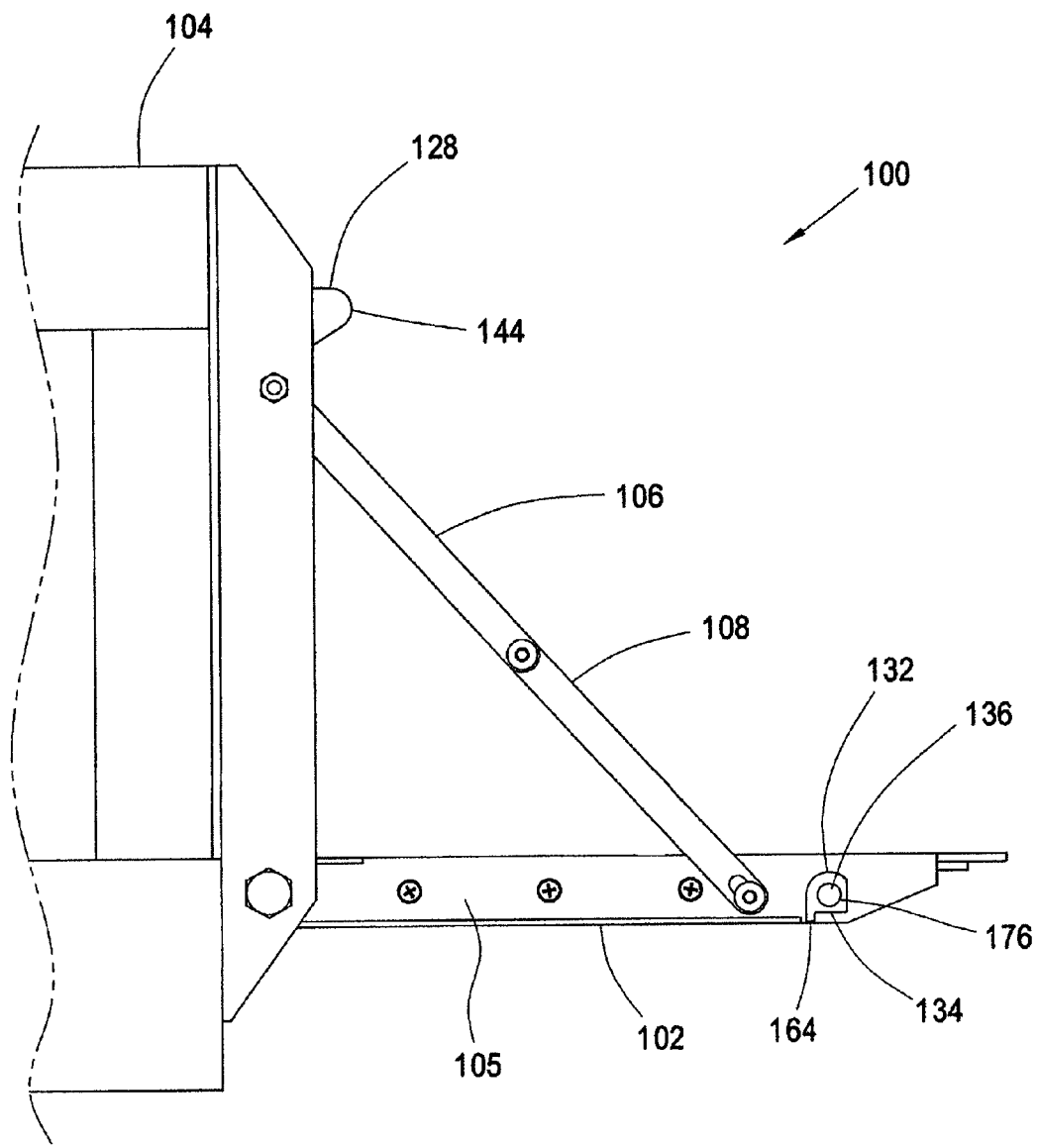
FIG. 1 is a side view of a tailgate having a latching mechanism according to one exemplary embodiment of the invention.
Figure 3:
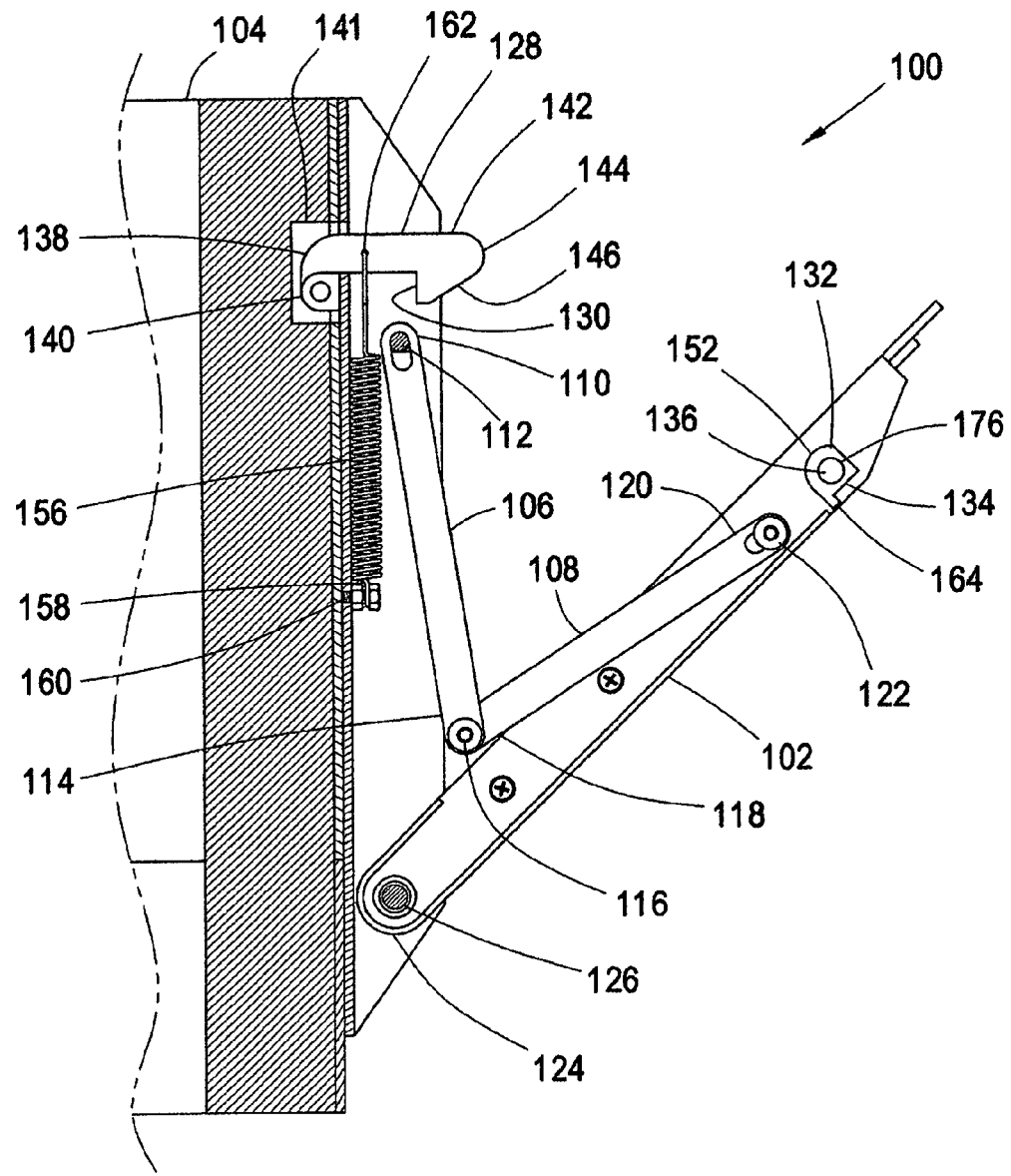
FIG. 3 is a side view of the tailgate shown in FIG. 1 with portions of the tailgate and vehicle removed for clarity in order to better illustrate the tailgate latching mechanism.

With further reference to FIG. 1, the tailgate 102 can be maintained in a generally horizontal lowered position by a pair of links 106 and 108. As shown in FIG. 3, the link 106 has a first end portion 110 pivotably connected to the vehicle supporting structure 104 by a pivot 112. A second end portion 114 of the link 106 is pivotably connected by a pivot 116 with an end portion 118 of the link 108. The other end portion 120 of the link 108 is pivotably connected to the tailgate 102 by a pivot 122. A wide range of means (e.g., rivets, pins, etc.) can be employed for pivotably connecting the links 106 and 108 to one another and to the tailgate 102 and vehicle structure 104. As an alternative, the pair of links can be replaced with a flexible member, such as cable or chain, for example.

Figure 2:
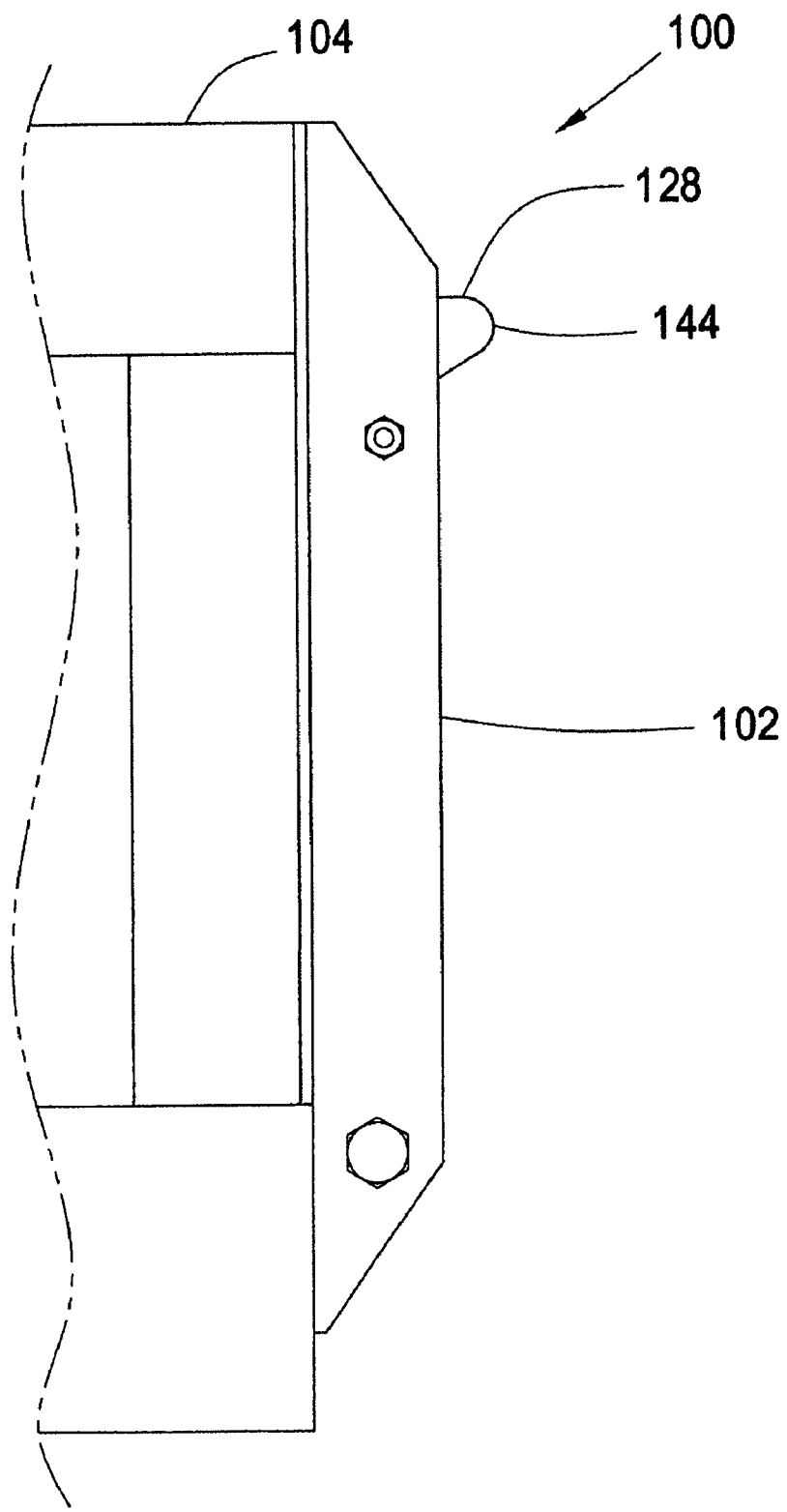
FIG. 2 is a side view of the tailgate shown in FIG. 1 and illustrating the tailgate in a closed position.

The tailgate 102 includes a lower edge portion 124 that is hingedly coupled 126 to the vehicle supporting structure 104. This allows the tailgate 102 to be hingedly moved between the opened position (FIG. 1) and the closed position (FIG. 2). In various embodiments, the hinge 126 and links 106, 108 are configured such that the tailgate 102 can be relatively easily removed and separated from the vehicle.

Figure 11:
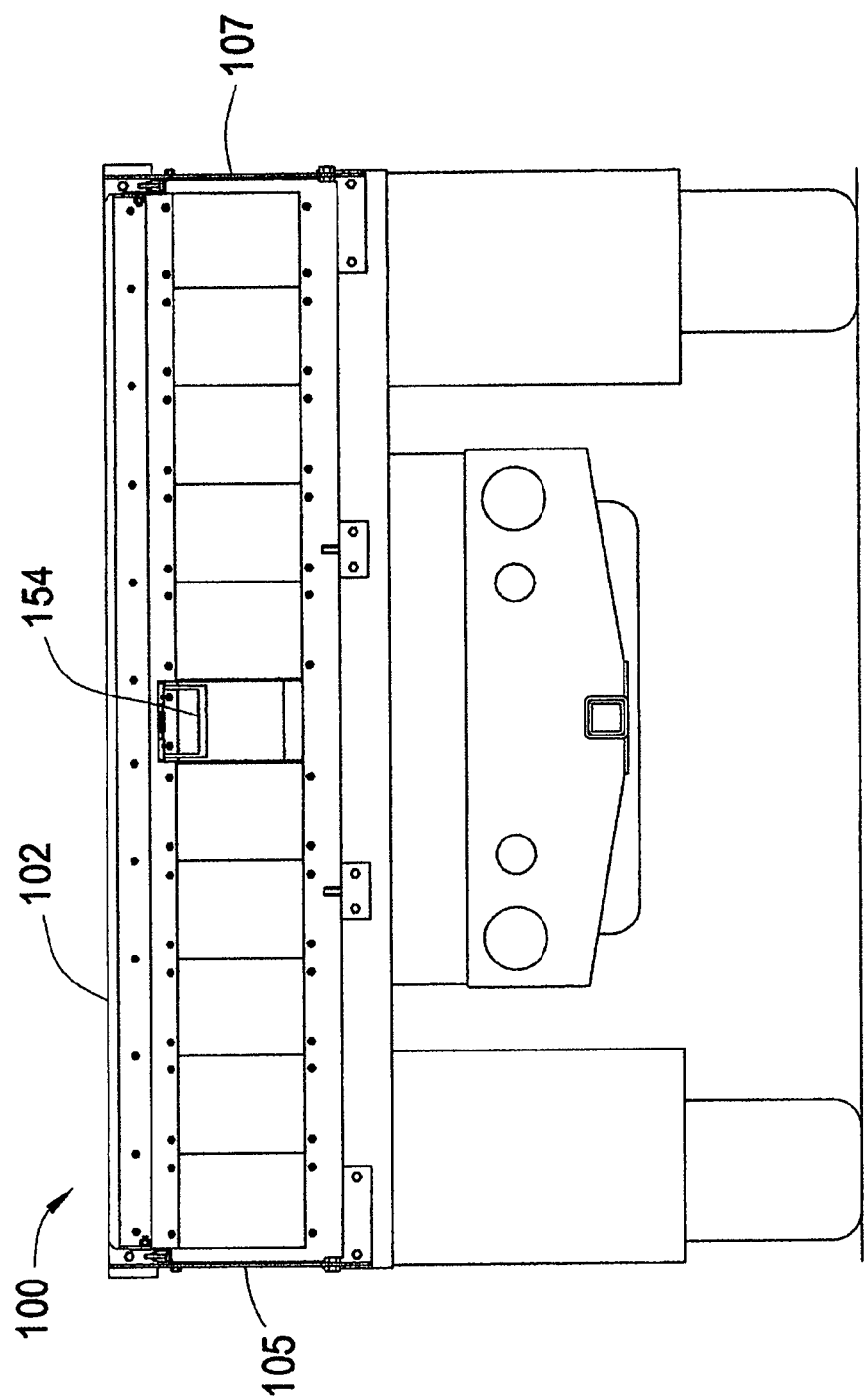
FIG. 11 is a rear view of the tailgate shown in FIG. 1 and illustrating a tailgate latching mechanism at each side of the tailgate.

As shown in FIG. 1, the latching mechanism 100 is operatively associated with the side 105 of the tailgate 102. In various embodiments, another latching mechanism 100 can be provided symmetrically positioned on the other side 107 of the tailgate 102 (as shown in FIG. 11). Alternatively, other embodiments can include only one tailgate latching mechanism for the tailgate. For example, some station wagons include a tailgate having one side vertically hinged to the vehicle such that the tailgate can be swung open like a typical refrigerator door outward. In such embodiments, one latching mechanism can be used on the other side of the tailgate that is not hinged to the vehicle. In yet other embodiments, two or more latching mechanisms can be used on the same side of the tailgate, for example, to provide for even more secure latching of the tailgate to the vehicle support structure.

Figure 4:
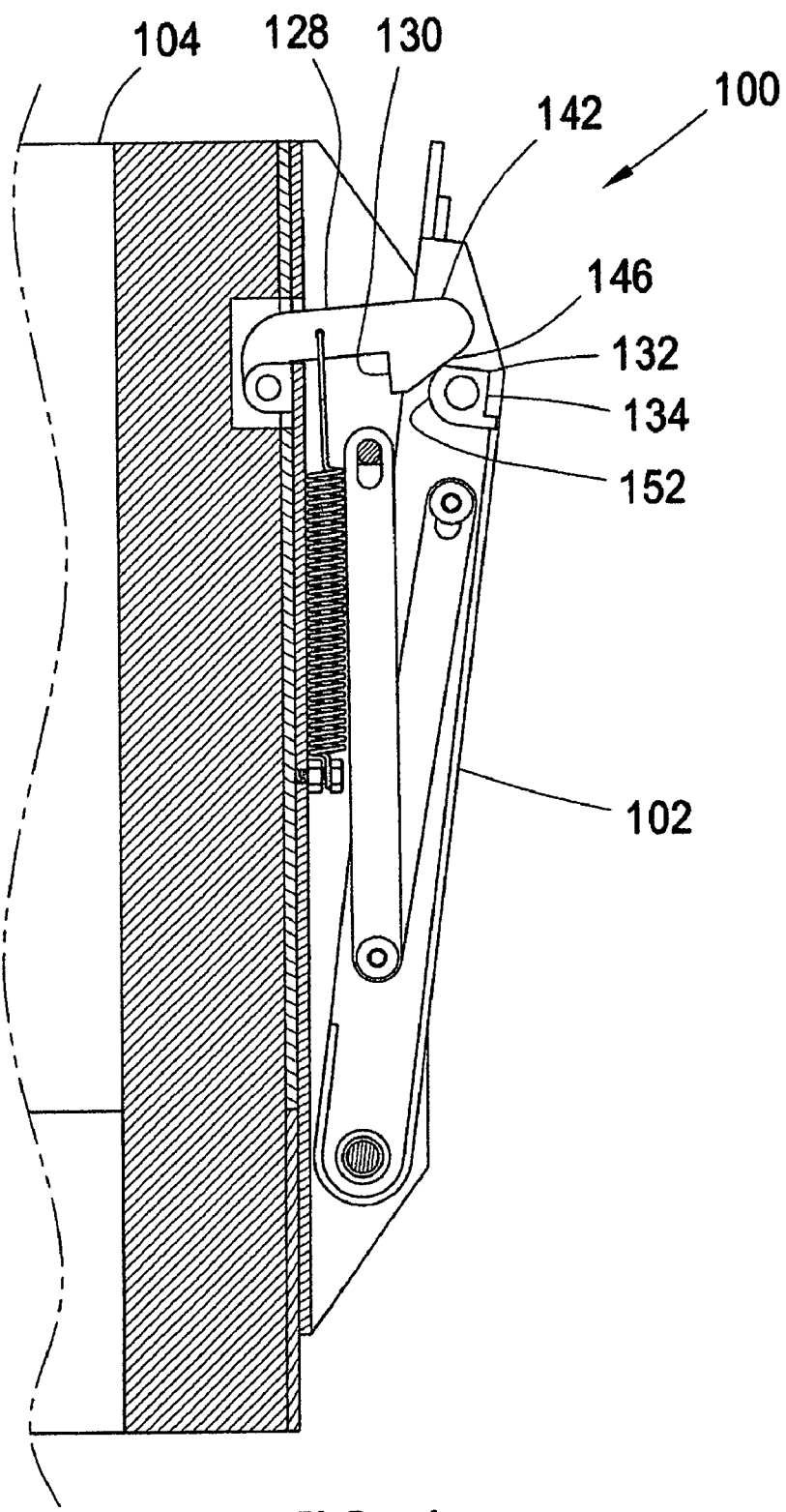
FIG. 4 is a side view of the tailgate latching mechanism shown in FIG. 3 and illustrating the latch's camming surface in contact with the keeper's camming surface.
Figure 5:
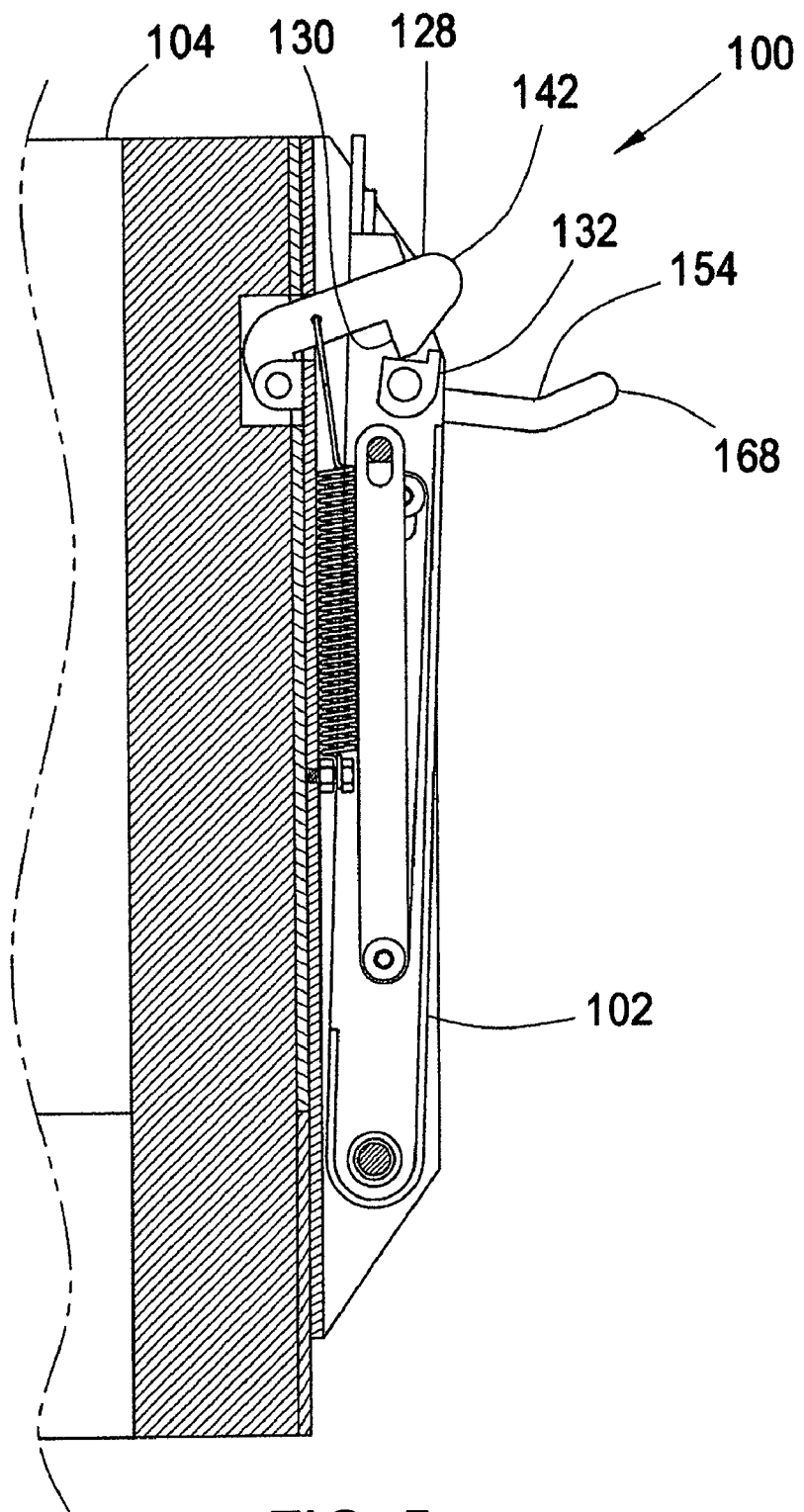
FIG. 5 is a side view of the tailgate latching mechanism shown in FIG. 3 and illustrating the latch in contact with the keeper surface.
Figure 6:
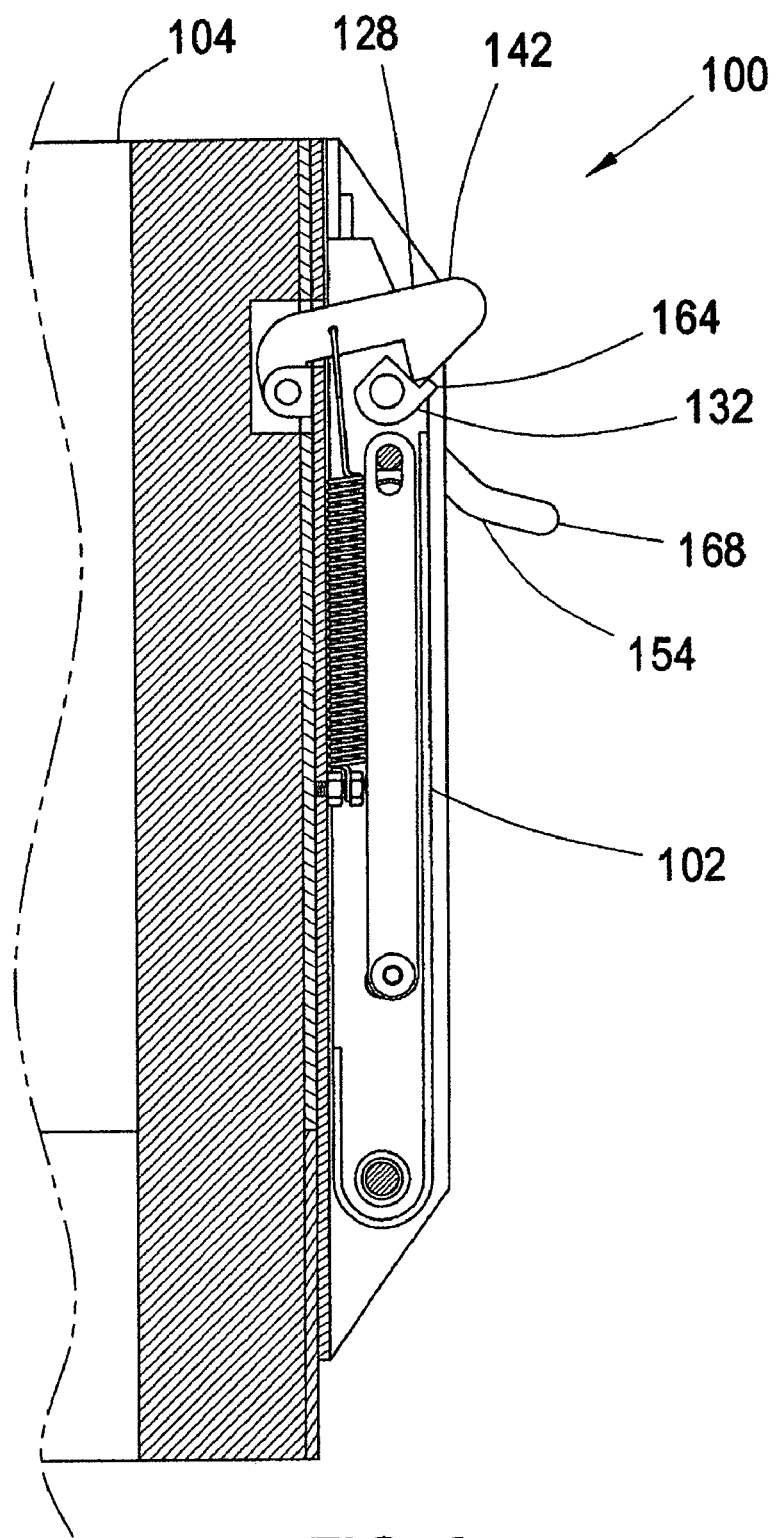
FIG. 6 is a side view of the tailgate latching mechanism shown in FIG. 3 and illustrating the keeper's tang in contact with the latch.
Figure 7:
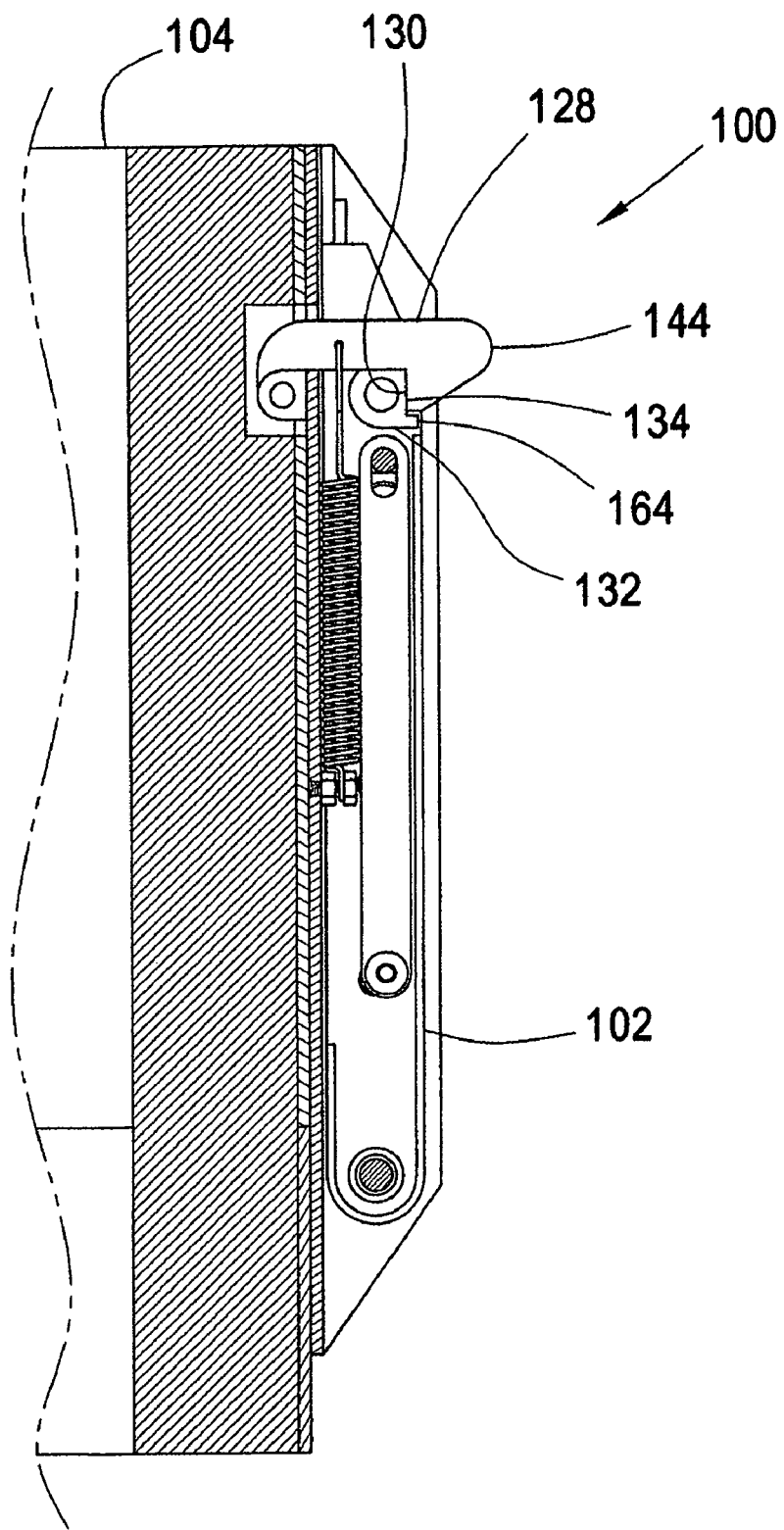
FIG. 7 is a side view of the tailgate latching mechanism shown in FIG. 3 and illustrating the latching surface engaged with the keeper surface.

With continued reference to FIGS. 3 through 7, the latching mechanism 100 includes a latch 128 having a latching surface 130. The latch 128 is pivotably coupled to the vehicle supporting structure 104 such that the latch 128 is pivotable between an opened position and a closed position (FIGS. 3 and 7). The latching mechanism 100 also includes a keeper 132 having a keeper surface 134 configured for engagement with the latching surface 130. The latching mechanism 100 further includes a member 136 (FIG. 8) for rotating the keeper 132. The member 136 is rotatably supported by the tailgate 102 such that the member 136 is rotatable between at least a first position (FIG. 7) and a second position (FIG. 5). As described herein, rotation of the member 136 from the first position towards the second position rotates the keeper 132, which, in turn, causes pivotal movement of the latch 128 from the closed position towards the opened position. This, in turn, can disengage the latching surface 130 from the keeper surface 134.

With further regard for the latch 128, the end portion 138 of the latch 128 is disposed within a recess 141 defined by the vehicle supporting structure 104. The latch's end portion 138 is also pivotably coupled to the vehicle supporting structure 104 such that the latch 128 is pivotable between an opened position and a closed position (FIGS. 3 and 7). In the illustrated embodiment, the opened position for the latch 128 refers to a position in which the latch's end portion 142 of the latch 128 has been pivoted generally upward in the counterclockwise direction. FIGS. 3 and 7 illustrate the latch 128 in a closed position wherein the latch 128 is generally horizontal. Alternatively, the latch orientation can be reversed such that the latch is in the opened position after the free end portion of the latch has been pivoted generally downward in the clockwise direction. In other embodiments, the latch, when in the closed position, is not horizontal but instead is at an angle (e.g., acute angle, right angle or vertical, etc.) relative to the horizontal plane.

In the illustrated embodiment, the latch 128 is pivotably coupled to the vehicle supporting structure 104 with a pivot 140. The pivot 140 is substantially aligned with the keeper's 132 axis of rotation. The pivot 140 is also positioned to be substantially aligned with a resultant of any load applied to the latching surface 130 by the keeper surface 134. This alignment of the pivot 140 with the load resultant eliminates the moment (or at least reduces the length of the moment arm) created by a load on the latching surface 130. As an example, the latching surface 130 may be subject to loading that occurs while transporting cargo within a pickup truck bed when that cargo pushes against the tailgate 102.

Figure 12:
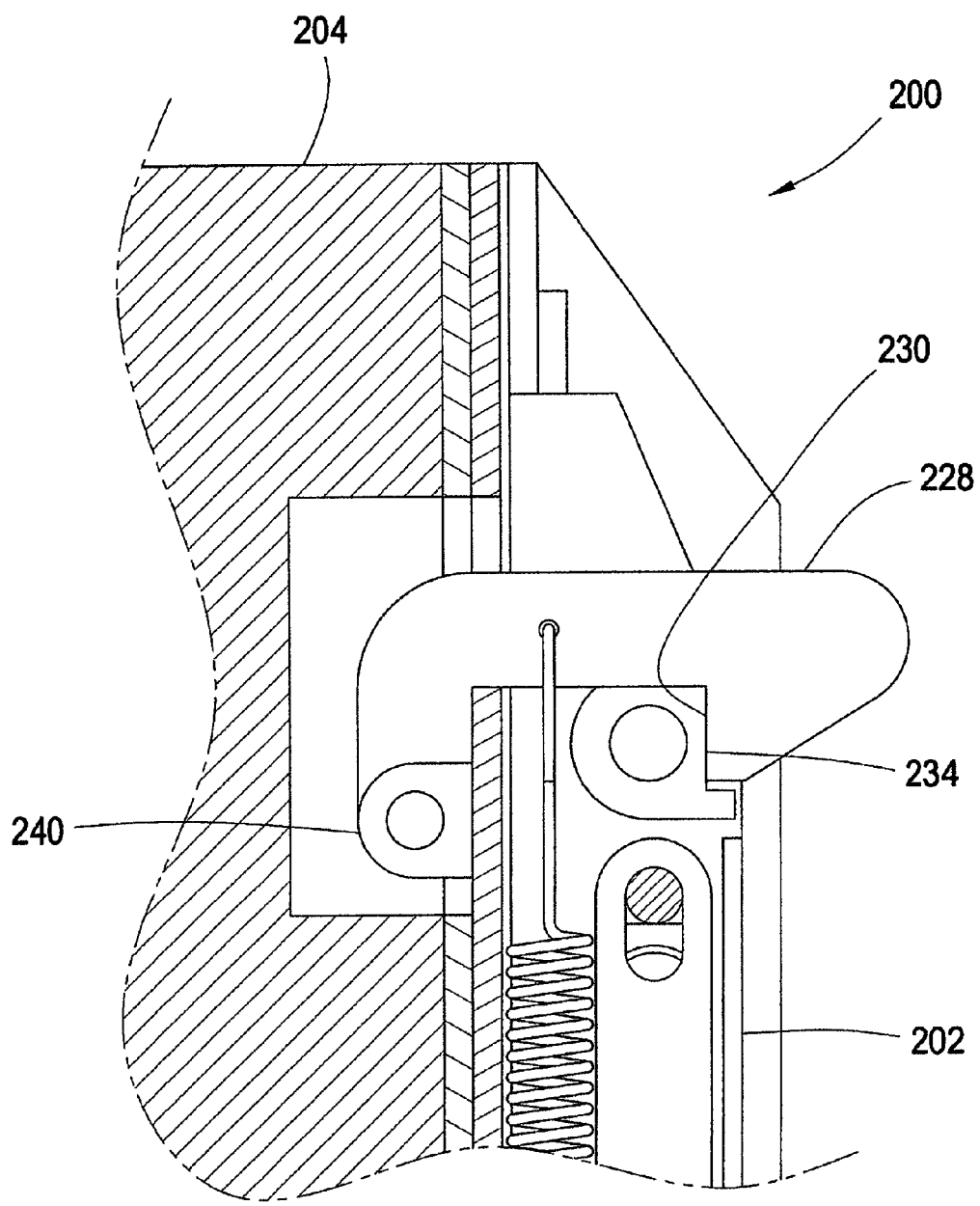
FIG. 12 is a side view of a tailgate (with portions of the tailgate and vehicle removed for clarity) wherein the tailgate includes another embodiment of a tailgate latching mechanism having a latch pivotably coupled to the vehicle supporting structure with a pivot positioned relative to the latching surface such that the moment created by a load applied to the latching surface while engaged with the keeper surface biases the latch towards the closed position.

Alternatively, other pivot locations can be employed for the latch. For example, other embodiments include a latch pivotably coupled to the vehicle supporting structure with a pivot disposed relative to the latching surface such that the moment, created by a load applied to the latching surface while engaged with the keeper surface, biases the latch towards the closed position. In the particular embodiment shown in FIG. 12, the tailgate latching mechanism 200 includes a latch 228 pivotably mounted to the vehicle supporting structure 204 with a pivot 240 that is below the latching surface 230. With this pivot 240 location, the moment created by a load applied to the latching surface 230 by the keeper surface 234 biases the latch 228 towards the (clockwise in FIG. 12) closed position. This feature provides for a more secure engagement between the latching surface 230 and the keeper surface 234. This can be beneficial, for example, while transporting heavy cargo because the load experienced by the latching surface 230 due to the cargo pushing against the tailgate 202 helps retain the engagement of the latching surface 230 with the keeper surface 234 and inhibit inadvertent opening of the tailgate 202.

In yet another embodiment, the pivot for the latch is positioned relative to the latching surface such that the moment, created by a load applied to the latching surface by the keeper surface, biases the latch towards the opened position. This allows the latching surface to be more easily disengaged from the keeper surface, which may be beneficial for some applications.

Referring back to FIG. 3, the latch's end portion 142 includes a generally rounded end 144 and an inclined or slanting surface 146. The latching surface 130 is generally vertical when the latch 128 is in the closed position and the vehicle is on level ground. Alternative embodiments include a latching surface that is inclined or slanted relative to the vertical plane.

The latch's slanted surface 146 can operate as a camming surface, in cooperation with the keeper's camming surface 152, for causing pivotal movement of the latch 128 from the closed position towards the opened position. As shown in FIG. 4, closing the tailgate 102 positions the latch's camming surface 146 in contact with the keeper's camming surface 152 and causes pivotal movement of the latch 128 from the closed position towards the opened position. While the camming surface 146 is shown as a generally slanted surface in FIGS. 3 through 7, alternative embodiments include the camming surface 146 being generally rounded or curved. In yet other embodiments, however, the latch does not include a camming surface that acts in cooperation with a camming surface of the keeper for causing pivotal movement of the latch from the closed position towards the opened position.

As shown in FIG. 2, the latch 128 is configured (e.g., sized, shaped, pivotably mounted) such that at least a portion of the latch's end 144 is external to the tailgate 102 when the tailgate 102 is closed. Alternative configurations (e.g., shapes, sizes, etc.) can be employed for the latch depending, for example, on the particular application (e.g., available space, desired latching force, etc.) in which the latching mechanism will be used. For example, another embodiment includes a latch and tailgate that are sized (e.g., the latch length and tailgate thickness) such that the latch is completely within the tailgate body and thus hidden from view.

In addition, a wide range of materials can be used for the latch 128. In one embodiment, the latch 128 is formed from steel. In another embodiment, the latch 128 is formed from stainless steel. Alternatively, the latch can be formed from other materials (e.g., other metals, etc.) having sufficient strength and wear properties suitable for the particular application in which the latching mechanism will be used.

In various embodiments, one or more biasing devices can be provided for biasing the latch towards either the closed position or the opened position. For example, and as shown in FIGS. 3 through 7, the latching mechanism 100 includes a coil spring 156 having a first end portion 158 coupled to the vehicle supporting structure 104 with a nut and bolt 160. The spring 156 also includes a second end portion 162 coupled to the latch 128. In this particular embodiment, the spring 156 is a contractile coil spring that applies a biasing force to the latch 128 for biasing the latch 128 downwardly towards the closed position. In this manner, the spring 156 inhibits pivoting movement of the latch 128 towards the opened position. This feature can help prevent (or at least inhibit) the inadvertent unlatching of the latching surface 130 from the keeper surface 134, for example, while the vehicle is traveling on rough bumpy terrain.

Alternative biasing devices can also be used for biasing a latch towards either the closed position or the opened position. The particular biasing device (e.g., type, configuration, size, shape, positioning, etc.) used for a tailgate latching mechanism of the present invention can depend, for example, on the desired magnitude and direction for the biasing force to be imparted to the latch by the biasing device. By way of example only, other embodiments include other types of springs (e.g., torsion springs, leaf springs, etc.) for biasing the latch towards either the closed position or the opened position. In yet other embodiments, gravity is used for biasing the latch, such as by using the weight of the latch itself and/or by additional weights attached to the latch.

In other embodiments, a biasing device is not necessarily required and can be eliminated. For example, a biasing device can be eliminated in those embodiments in which the latch's pivot is mounted relative to the latching surface such that the moment, created by a load applied to the latching surface by the keeper surface, already sufficiently biases the latch towards the opened position.

With further regard to the keeper 132, the keeper surface 134 is configured to engage the latching surface 130 as shown in FIG. 7. The keeper surface 134 is generally vertical when engaged with the latching surface 130 and the vehicle is on level ground. Alternate embodiments include a keeper surface that is inclined or slanted relative to the vertical plane.

The keeper 132 can further include a tang or projection 164. The tang 164 extends in a direction generally outwardly away from the keeper surface 134. In various embodiments, the tang 164 is contiguous with and extends outwardly from the keeper surface 134. In other embodiments, however, a spaced distance (e.g., spaced distance in a direction into the page of the FIG. 3) separates the tang 164 from the keeper surface 134. In either case, rotating the keeper 132 causes the tang 164 to contact the latch 128 (FIG. 6), when the latching and keeper surfaces 130 and 134 are engaged, and causes pivotal movement of the latch 128 from the closed position towards the opened position. While the inclusion of the tang is preferred, the tang is not necessary or required for all embodiments. For example, alternative embodiments do not include a tang or projection that contacts the latch when the latching and keeper surfaces are engaged, and causes pivotal movement of the latch from the closed position towards the opened position.

With continued reference to FIGS. 3 and 4, the keeper 132 also includes a camming surface 152. The camming surface 152 is generally opposite the keeper surface 134. In this particular embodiment, the camming surface 152 is generally rounded or curved. Alternatively, the camming surface can instead be inclined or slanted. In either case, closing the tailgate 102 positions the keeper's camming surface 152 into contact with the latch's camming surface 146 and causes pivotal movement of the latch 128 from the closed position towards the opened position, as shown in FIG. 4. The pivotal movement of the latch 128 towards the opened position allows the latching surface 130 to be moved across the keeper 132 and beyond the keeper surface 134 for engaging the keeper surface 134. As the tailgate 102 is being closed (as represented by the various tailgate positions depicted in FIGS. 3 through 7), the keeper 132 will ride under the latch's end portion 142 and pivot the latch 128 upward against the biasing force of the spring 156. Eventually, the latching surface 130 will be able to drop in behind the keeper surface 134.

Alternative configurations (e.g., shapes, sizes, etc.) can be employed for the keeper depending, for example, on the particular application (e.g., available space, desired latching force, etc.) in which the latching mechanism will be used.

In addition, a wide range of materials can be used for the keeper 132. In one embodiment, the keeper 132 is formed from steel. In another embodiment, the latch 128 is formed from stainless steel. Alternatively, the keeper can be formed from other materials (e.g., other metals, etc.) having sufficient strength and wear properties suitable for the particular application in which the latching mechanism will be used.

The keeper 132 is mounted to one end portion 176 of the member 136. The keeper 132 can be mounted to the member using various means, such as with welding, pins, screws, other mechanical fasteners, combinations thereof, among other suitable methods and systems, etc. In further embodiments, the keeper 132 may be an integral part of the member 136 such that the keeper 132 and member 136 are integrally formed as a single component.

In various embodiments, the keeper 132 is coupled for common rotation with the member 136 about the member's longitudinal axis. Other embodiments, however, do not include a keeper directly affixed to an end of the member. Instead, the keeper(s) can be coupled to the member through one or more gears or other linkage member(s). For example, one or more keepers can include gear teeth that are engaged with (e.g., directly engaged with, indirectly engaged via one or more intermediate gears with) teeth of a gear, which, in turn, is disposed on an end portion of the member. In such alternative embodiments, the keeper(s) can rotate in the same or the opposite direction as the member.

Figure 8:
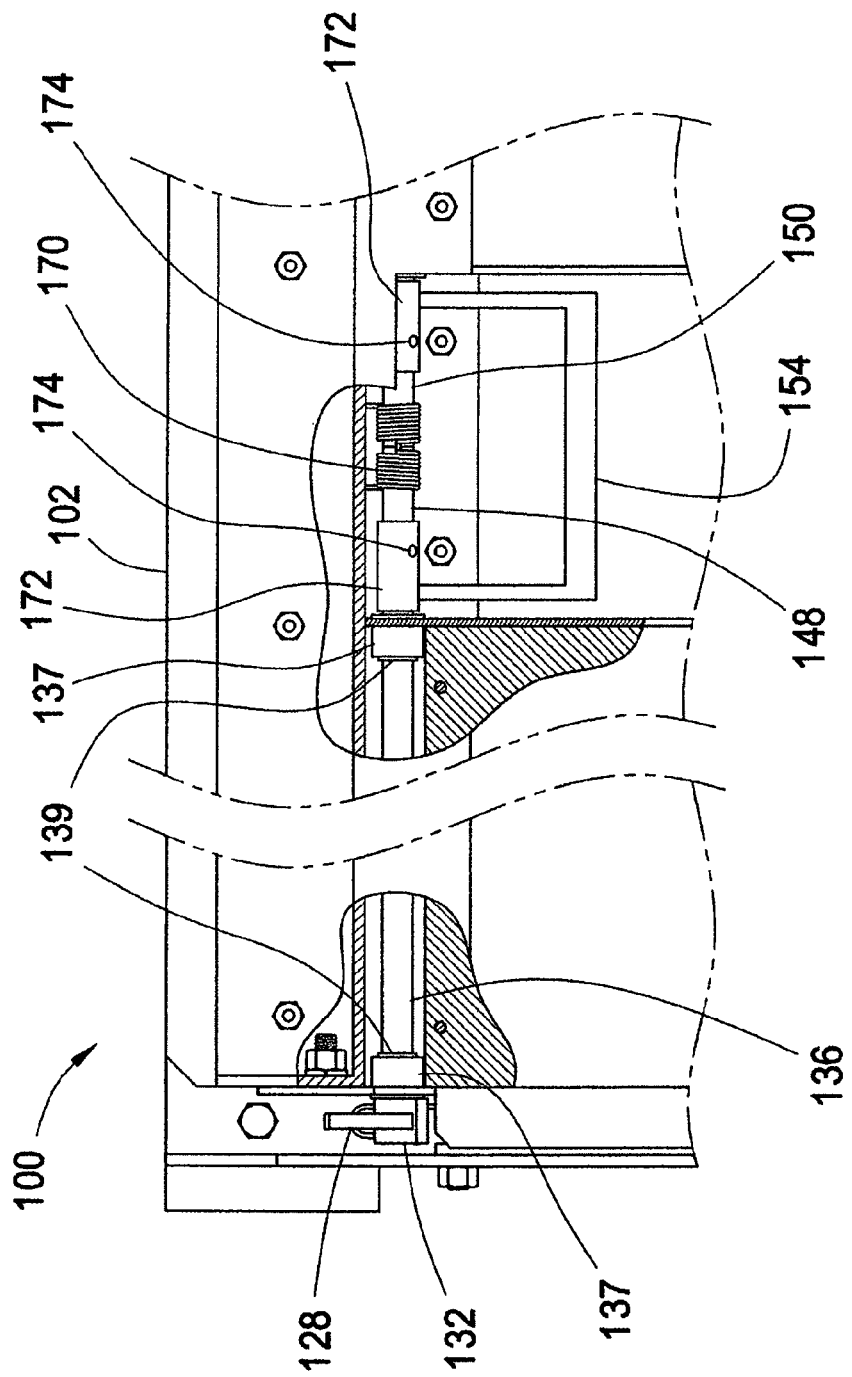
FIG. 8 is a partial rear view of the tailgate shown in FIG. 1 with a portion removed for clarity in order to better illustrate various components of the tailgate latching mechanism, including the member extending across the tailgate, the keeper disposed at one end portion of the member, the torsion spring that biases the member in a closed position, and the handle coupled to the member.
Figure 9:
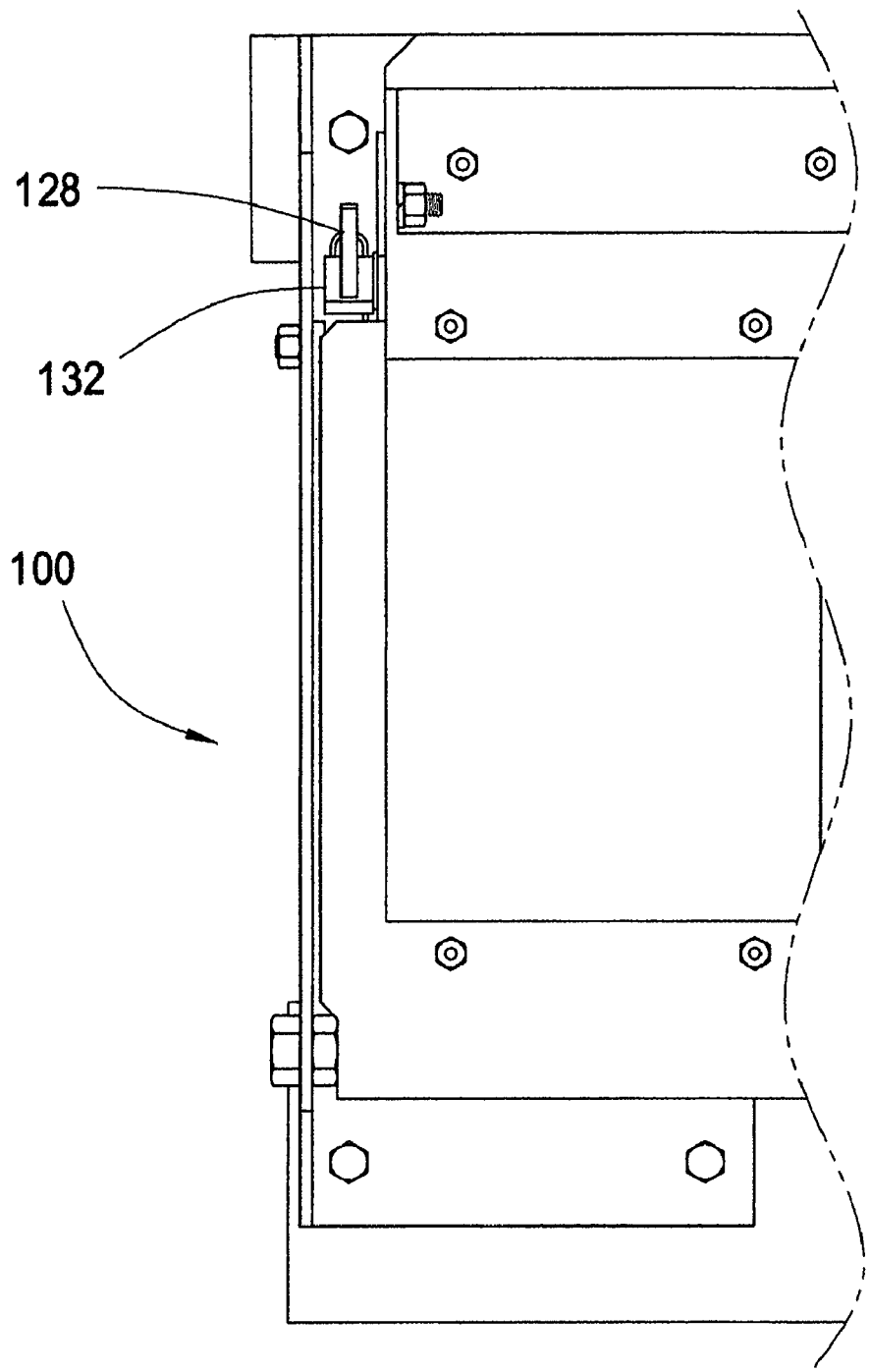
FIG. 9 is a partial rear view of the tailgate shown in FIG. 1.
Figure 10:
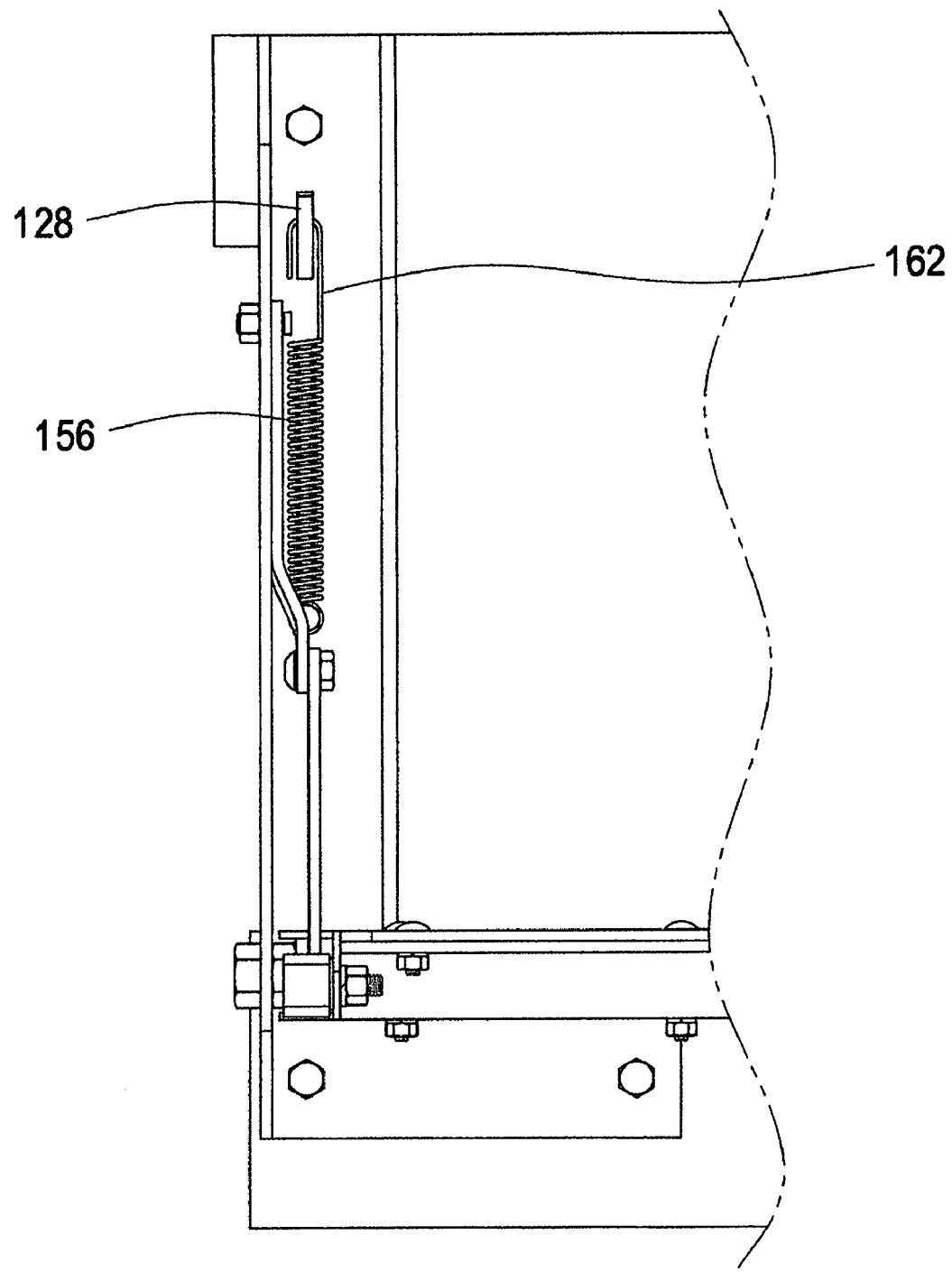
FIG. 10 is a partial rear view of the tailgate shown in FIG. 9 with a portion removed in order to better illustrate various components of the tailgate latching mechanism, including the coil spring that biases the latch in a closed position.

In the exemplary embodiment shown in FIG. 8, the member 136 comprises two separate rods 148 and 150 that meet at about the middle of the tailgate 102. A keeper 132 is welded (or otherwise disposed) at one end of each rod 148, 150. The other end of each rod 148, 150 has a slot or groove cut (or otherwise formed) in about the center of the rod's face. This groove accepts one end of the spring 170. The groove in each rod 148, 150 is the means by which the springs 170 are attached to the rods 148, 150. Alternatively, other means can be used for attaching the springs 170 to the rods 148, 150, such as cross-holes, external slots, screw attachments, etc.

In an exemplary assembly, each rod 148 and 150 has a longitudinal axis substantially parallel with the tailgate's hinge axis 126. The rods 148 and 150 are supported by the tailgate 102 such that the rods 148 and 150 are rotatable about their respective longitudinal axes between at least a first position (FIG. 7) and a second position (FIG. 5). By way of example only, the rods 148 and 150 can be supported by through-holes in the tailgate 102. In the exemplary embodiment shown in FIG. 8, a piece of pipe 137 is welded (or otherwise disposed) at each through-hole, which increases the bearing width of the through-holes. A bearing or bushing 139 is inserted into the pipe 137 at each through-hole to facilitate the rod's rotation (e.g., reduce friction associated therewith). The bushing 139 can be formed of a wide range of suitable materials, such as nylon, other types of plastics (e.g., acetal, polyethylene, etc.), metals (e.g., bronze, etc.), composite materials, etc. Alternatively, other means can be employed for rotatably supporting the member 136.

Each rod 148, 150 (having a keeper 132 already welded or otherwise attached thereto) is inserted into the tailgate 102, slotted end first, through bearings 139 and one leg 172 of the handle 154. Each rod 148, 150 is then engaged with one of the springs 170 by positioning one end of the spring 170 into the groove of the rod 148, 150. A spring pin 174 attaches the handle 154 to each rod 148, 150 and also rotatably secures the assembly in the tailgate 102. The other rod 148, 150 is inserted in the same way from the other end of the tailgate 102. The two rods 148, 150 preferably butt together at about the middle of the tailgate 102, thereby trapping the springs 170.

Alternatively, the member could be a single piece member; however, to facilitate assembly, at least one of the keepers would preferably be removable, and the springs would preferably be attached by alternative means such as a cross-hole, external slot, screw attachment, etc. In such embodiments, the single-piece member extends between the tailgate's sides, and the single-piece member has a longitudinal axis substantially parallel with the tailgate's hinge axis. The single-piece member can be supported by the tailgate such that the single-piece member is rotatable about its longitudinal axis between at least a first position and a second position. By way of example only, the single piece member can be supported by through-holes in the tailgate in a manner similar to that described above for the rods 148 and 150.

As shown in FIG. 3, the member 136 has a solid circular cross-section. Alternative cross-sectional shapes (e.g., rectangular, triangular, ovular, tubular, etc.) can also be used for the member depending on the particular application in which the latching mechanism will be used. For example, other embodiments include a hollow member in order to save weight.

As shown in FIG. 8, the handle 154 is coupled to the member 136 for common rotation therewith. In one particular embodiment, the handle 154 is attached to the rods 148 and 150 with spring pins 174. Alternatively, various other means can be used to couple the handle 154 to the rods 148 and 150.

The handle 154 is configured (e.g., sized, shaped, etc.) such that a portion 168 of the handle 154 is external to the tailgate 102 to allow a user to readily grasp and manipulate the handle 154. In one exemplary operation, the user may unlatch the latching mechanism 100 by grasping and lifting up on the handle portion 168, as represented by the various handle positions depicted in FIGS. 7, 6, and 5. This rotation of the handle 154 rotates the member 136, which, in turn, rotates the keeper(s) 132 at the end(s) 176 of the member 136 (only one end 176 of the member 136 is illustrated in the figures). The rotation of the keeper 132 causes the tang 164 to contact the latch 128 (FIG. 6) and cause pivotal movement of the latch 128 towards the opened position. With continued rotation of the keeper 132 (e.g., by continued upward lifting of the handle 154, FIG. 5) along with opening the tailgate 102, the latching surface 130 will ultimately disengage from the keeper surface 134.

In various embodiments, the latching mechanism includes one or more biasing devices for biasing the member and/or the handle towards a particular position. For example, and as shown in FIG. 8, the latching mechanism 100 includes a torsion spring 170 coupled to the handle 154 and to the tailgate 102. In this particular embodiment, the torsion spring 170 applies a biasing force to the handle 154 for biasing the handle 154 (and member 136 coupled thereto) towards the position shown in FIG. 8. Accordingly, the torsion spring 170 causes the member 136 and handle 154 (after the user releases the handle 154) to move from the position shown in FIG. 5 back to the position shown in FIG. 8.

Alternative biasing devices can also be used for biasing the handle 154 and/or member 136. The particular biasing device (e.g., type, configuration, size, shape, positioning, etc.) used for a tailgate latching mechanism of the present invention can depend, for example, on the desired magnitude and direction for the biasing force to be imparted to the handle by the biasing device. By way of example only, other embodiments include other types of springs (e.g., coil springs, leaf springs, etc.) for biasing the member and/or handle. In yet other embodiments, gravity is used for biasing the member and handle, such as by using the weight of the handle and/or by additional weights attached to the handle. In further embodiments, the latching mechanism does not include a biasing device for the member. Instead, the user may use the handle to return the member to its initial position.

In other embodiments, the handle can be relatively wide, for example, such that the handle width is about equal to the width of the tailgate. In such embodiments, a member (e.g., one or more rods) extending from one side of the tailgate to the other could be eliminated. In which case, the handle could provide the means for rotating the keeper(s). In further embodiments, a handle may be provided at each side of the tailgate such that again a member (e.g., one or more rods) extending across the tailgate would not be necessarily required. In these alternative embodiments, each handle could provide the means for rotating its corresponding keeper.

FIGS. 13 and 14 illustrate another embodiment of a tailgate latching mechanism 300. As shown, the latching mechanism 300 includes a stop 380 that is rotatable between a first position (FIG. 13) and a second position (FIG. 14). When the stop 380 is in the first position, the stop 380 contacts (or is in very close proximity to) the latch 328 in order to inhibit pivotal movement of the latch 328. This, in turn, helps maintain the engagement of the latching surface 330 (FIGS. 13A and 14A) with the keeper surface (not shown in FIGS. 13 and 14). When the stop 380 is in the second position, the stop 380 does not interfere with the pivotal movement of the latch 328.

The stop 380 is coupled to a member 382 for common rotation therewith. A projection or tab 384 extends outwardly from member 382, as shown in FIGS. 13B and 14B. This tab 384 allows a user to readily rotate the member 382 and the stop 380 coupled thereto between the first position (FIG. 13) and the second position (FIG. 14). Alternatively, other means can be employed for allowing a user to rotate the stop 380 between the first and second positions. For example, another embodiment includes a stop that can only be rotated with a key, thereby allowing the user to lock the stop in the first or second position.

In another embodiment, the stop comprises a removable pin sized to be received within an opening defined by the vehicle supporting structure. The pin and opening are configured (e.g., sized, positioned, etc.) such that when the pin is positioned within the opening, pivotal movement of the latch is prevented (or at least inhibited) by contact between the pin and the latch. In one embodiment, the opening is positioned, for example, at about (or slight lower than) where the member 382 is positioned as shown in FIGS. 13 and 14. In this embodiment, the opening is immediately above the latch such that, when the pin is positioned within the opening, the pin contacts (or is in very close proximity to) the latch. In this embodiment, the pin prevents (or at least inhibits) the latch from pivoting upward. After removing the pin from the opening, however, the latch can again be pivoted upwardly. To help prevent the pin from being lost or dropped, the pin may be tethered to the tailgate, for example, with a flexible wire or cable.

In a further embodiment, the stop comprises a single actuator, such as a rotatable knob or a keyed equivalent located in about the center of the tailgate by the handle. This actuator is connected by a linkage (e.g., rods, cables, combinations thereof, etc.) to pins at each end of the tailgate. The pins extend outside of the tailgate through holes in the tailgate located just above the latches when the tailgate is in the closed position. Rotating the knob or key extends or retracts the pins to lock and unlock the tailgate.

With various embodiments of the tailgate latching mechanism, the tailgate can still be readily unlatched and opened even when pressure is being applied against the tailgate from a load of material within the truck bed. This is unlike some existing tailgate latches which can be rather difficult to unlatch when a load within the truck bed is applying pressure against the tailgate.

The teachings of the present invention can be applied to a wide range of tailgates for various types of vehicles, including pickup trucks, hatchbacks, station wagons, large commercial-type trucks, and other vehicles having a tailgate. Accordingly, the present invention should not be limited to use with any specific form/type of tailgate or vehicle. Plus, aspects of the present invention should also not be limited to just tailgates as the teachings of the present invention can be applied to a wide range of other types of doors, gates, panels, sliding doors, swinging doors, hinged doors, fence gates, cabinet doors, etc.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present invention and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. Apparatus comprising:
   a supporting structure;
   a closure moveably attached to the supporting structure for movement between an open position and a closed position;
   a keeper moveably attached to the closure, said keeper having a keeper surface;
   a latch moveably connected to the supporting structure, said latch having a latching surface and being movable between a closed position, in which the latching surface engages the keeper thereby retaining the closure in the closed position, and an open position, in which the latching surface is disengaged from the keeper thereby permitting the closure to move toward the open position; and
   a member operatively connected to the keeper rotatable between a first position and a second position such that rotation of the member from the first position toward the second position rotates the keeper so the keeper causes movement of the latch from the closed position toward the open position when the latching surface and keeper surface are engaged;
   wherein the latch is movably coupled to the supporting structure such that a moment created by a load applied to the latch by the keeper when the latch is closed biases the latch against movement from the closed position toward the open position.

2. Apparatus as set forth in claim 1, wherein the latch is pivotable between the closed position and the open position.

3. Apparatus as set forth in claim 2, wherein the latch is pivotably coupled to the supporting structure with a pivot.

4. Apparatus as set forth in claim 3, wherein the keeper has an axis of rotation and the latch has a rotational axis that is not perpendicular to the keeper's axis of rotation.

5. Apparatus as set forth in claim 3, wherein the keeper is rotatable on an axis of rotation and the latch has a rotational axis that is substantially parallel to the keeper's axis of rotation.

6. Apparatus as set forth in claim 1, further comprising a stop having a first position in which the stop contacts the latch and thereby inhibits movement of the latch toward the open position, and a second position in which the stop does not interfere with the movement of the latch.

7. Apparatus as set forth in claim 1, wherein the keeper includes a protrusion, and the keeper is movable between at least a first position and a second position, such that when the latching and keeper surfaces are engaged, movement of the keeper from the first position toward the second position causes the protrusion to contact the latch thereby causing movement of the latch from the closed position toward the open position, thereby disengaging the latching and keeper surfaces.

8. A vehicle including a tailgate constituting the closure and the apparatus of claim 1, wherein engagement of the latching and keeper surfaces latches the tailgate to the supporting structure of the vehicle.

9. Apparatus comprising:
a supporting structure;
a closure moveably attached to the supporting structure for movement between an open position and a closed position;
a latch pivotably coupled to one of the closure and the supporting structure for rotation about a first axis of rotation between an open position and a closed position, the latch having a latching surface;
a keeper rotatably attached to another of the closure and the supporting structure for rotation about a second axis of rotation that is not perpendicular to said first axis of rotation, said keeper having a keeper surface operable to engage the latch when the latch is in its closed position; and
wherein the latch is movably coupled to the supporting structure such that a moment created by a load applied to the latch by the keeper when the latch is closed biases the latch against movement from the closed position toward the open position; and
wherein a distance between the second axis of rotation and the latching surface is less than a distance between the first axis of rotation and the latching surface when the latch is in the closed position and the keeper surface is engaged with the latching surface.

10. Apparatus as set forth in claim 9, wherein said first rotational axis is substantially parallel to the second axis of rotation.

11. Apparatus as set forth in claim 9 further comprising a stop having a first position in which the stop contacts the latch and thereby inhibits movement of the latch toward the open position, and a second position in which the stop does not interfere with the movement of the latch.

12. A vehicle including a tailgate constituting the closure and the apparatus of claim 9, wherein engagement of the latching and keeper surfaces latches the tailgate to supporting structure of the vehicle.

13. Apparatus as set forth in claim 9, wherein rotation of the keeper causes movement of the latch from the closed position toward the open position when the latching surface and keeper surface are engaged.

14. Apparatus as set forth in claim 9, wherein the keeper includes a protrusion, and the keeper is movable between at least a first position and a second position, such that when the latching and keeper surfaces are engaged, movement of the keeper from the first position toward the second position causes the protrusion to contact the latch thereby causing movement of the latch from the closed position toward the open position.

15. Apparatus comprising:
a supporting structure;
a closure moveably attached to the supporting structure for movement between an open position and a closed position;
a latch pivotably coupled to one of the closure and the supporting structure for rotation about a first axis of rotation between an open position and a closed position, the latch having a latching surface;
a keeper rotatably attached to another of the closure and the supporting structure for rotation about a second axis of rotation that is not perpendicular to said first axis of rotation, said keeper having a keener surface operable to engage the latch when the latch is in its closed position; and
a member rotatable between at least a first position and a second position such that rotation of the member from the first position toward the second position rotates the keeper such that, when the latching and keeper surfaces are engaged, the keeper causes movement of the latch from the closed position toward the open position, thereby disengaging the latching and keeper surfaces;
wherein a distance between the second axis of rotation and the latching surface is less than a distance between the first axis of rotation and the latching surface when the latch is in the closed position and the keeper surface is engaged with the latching surface.

16. Apparatus as set forth in claim 15, wherein said first rotational axis is substantially parallel to the second axis of rotation.

17. Apparatus as set forth in claim 15 further comprising a stop having a first position in which the stop contacts the latch and thereby inhibits movement of the latch toward the open position, and a second position in which the stop does not interfere with the movement of the latch.

18. A vehicle including a tailgate constituting the closure and the apparatus of claim 15, wherein engagement of the latching and keeper surfaces latches the tailgate to supporting structure of the vehicle.

19. Apparatus comprising:
a supporting structure;
a closure moveably attached to the supporting structure for movement between an open position and a closed position;
a latch pivotably coupled to one of the closure and the supporting structure for rotation about a first axis of rotation, the latch having a latching surface; and
a keeper rotatably attached to another of the closure and the supporting structure for rotation about a second axis of rotation that is not perpendicular to said first axis of rotation, said keener having a keeper surface operable to engage the latch when the latch is in its closed position;
wherein the keeper includes a protrusion, and the keeper is movable between at least a first position and a second position, such that when the latching and keeper surfaces are engaged, movement of the keeper from the first position toward the second position causes the protrusion to contact the latch thereby causing movement of the latch from the closed position toward the open position, thereby disengaging the latching and keeper surfaces; and
a distance between the second axis of rotation and the latching surface is less than a distance between the first axis of rotation and the latching surface when the latch is in the closed position and the keener surface is engaged with the latching surface.

20. Apparatus as set forth in claim 15, wherein the keeper includes a protrusion, and the keeper is movable between at least a first position and a second position, such that when the latching and keeper surfaces are engaged, movement of the keeper from the first position toward the second position causes the protrusion to contact the latch thereby causing movement of the latch from the closed position toward the open position.

21. Apparatus as set forth in claim 15, wherein the latch is movably coupled to one of the closure and the supporting structure such that a moment created by a load applied to the latch by the keeper when the latch is in its closed position biases the latch against movement from the closed position toward the open position.

22. Apparatus as set forth in claim 19, wherein said first rotational axis is substantially parallel to the second axis of rotation.

23. Apparatus as set forth in claim 19 further comprising a stop having a first position in which the stop contacts the latch and thereby inhibits movement of the latch toward the open position, and a second position in which the stop does not interfere with the movement of the latch.

24. A vehicle including a tailgate constituting the closure and the apparatus of claim 19, wherein engagement of the latching and keeper surfaces latches the tailgate to supporting structure of the vehicle.

25. Apparatus as set forth in claim 19, wherein the latch is movably coupled to one of the closure and the supporting structure such that a moment created by a load applied to the latch by the keeper when the latch is in its closed position biases the latch against movement from the closed position toward the open position.

26. Apparatus comprising:
a supporting structure;
a closure moveably attached to the supporting structure for movement between an open position and a closed position;
a latch moveably connected to one of the closure and the supporting structure, said latch having a latching surface, the latch being movable between a closed position and an open position; and
a keeper moveably connected to another of the closure and the supporting structure, said keeper having a keeper surface and a protrusion, the keeper movable between a first position and a second position, the keeper surface configured for engagement with the latching surface;
whereby when the latching and keeper surfaces are engaged, movement of the keeper from the first position toward the second position causes the protrusion to contact the latch thereby causing movement of the latch from the closed position toward the open position, thereby disengaging the latching and keeper surfaces.

27. Apparatus as set forth in claim 26, wherein the protrusion extends in a direction generally outwardly away from the keeper surface.

28. A vehicle including a tailgate constituting the closure and the apparatus of claim 26, wherein engagement of the latching and keeper surfaces latches the tailgate to supporting structure of the vehicle.

29. Apparatus as set forth in claim 26 further comprising a stop having a first position in which the stop contacts the latch and thereby inhibits movement of the latch toward the open position, and a second position in which the stop does not interfere with the movement of the latch.

30. Apparatus as set forth in claim 26, wherein the latch is movably coupled to one of the closure and the supporting structure such that a moment created by a load applied to the latch by the keeper when the latch is in its closed position biases the latch against movement from the closed position toward the open position.

31. A vehicle comprising:
a tailgate mounted on a supporting structure of the vehicle for rotation about a first axis in a first direction from a closed position to an open position of the tailgate;
a keeper pivotally mounted on the tailgate for movement with the tailgate about said first axis and for movement with respect to the tailgate, the keeper comprising a keeper surface; and
a latch having a latching surface, the latch being mounted on said vehicle supporting structure for rotation about a second axis in a second direction substantially opposite said first direction from a latching position to a non-latching position, the second axis being spaced from the first axis by a first distance and the latching surface being spaced from said second axis by a second distance, said second distance being shorter than said first distance;
wherein the keeper comprises a protrusion, the keeper is moveable between a first and second position, and movement of the keeper from the first position toward the second position when the latching surface is engaged with the keeper surface causes the protrusion to move the latch from its latching position toward its non-latching position; and
the latching surface engages the keeper surface when the tailgate is closed and the latch is in the latching position to hold the tailgate in the closed position.

32. A vehicle as set forth in claim 31 further comprising a stop moveable between a first position in which the stop contacts the latch and thereby inhibits movement of the latch toward the non-latching position and a second position in which the stop does not interfere with movement of the latch.

33. A vehicle as set forth in claim 31, wherein the tailgate is generally vertical in its closed position and generally horizontal in its open position.

34. A vehicle as set forth in claim 31, wherein the tailgate is mounted on the supporting structure by a hinge connecting a bottom of the tailgate to the supporting structure.

35. A vehicle as set forth in claim 31, wherein the tailgate is releasably secured to the supporting structure for removal of the tailgate from the vehicle.

36. A vehicle as set forth in claim 31, wherein the latch is movably coupled to the supporting structure such that a moment created by a load applied to the latch by the keeper when the latch is in its latching position biases the latch against movement from the latching position toward the non-latching position.

37. A vehicle comprising:
a tailgate mounted on a supporting structure of the vehicle for rotation about a first axis in a first direction from a closed position to an open position of the tailgate;
a keeper pivotally mounted on the tailgate for movement with the tailgate about said first axis and for movement with respect to the tailgate, the keeper comprising a keeper surface; and
a latch having a latching surface, the latch being mounted on said vehicle supporting structure for rotation about a second axis in a second direction substantially opposite said first direction from a latching position to a non-latching position, the second axis being spaced from the first axis by a first distance and the latching surface being spaced from said second axis by a second distance, said second distance being shorter than said first distance;
wherein the keeper is rotatable on a third axis between its first and second positions and said third axis is substantially parallel to said second axis; and
the latching surface engages the keeper surface when the tailgate is closed and the latch is in the latching position to hold the tailgate in the closed position.

38. A vehicle as set forth in claim 37 further comprising a stop moveable between a first position in which the stop contacts the latch and thereby inhibits movement of the latch toward the non-latching position and a second position in which the stop does not interfere with movement of the latch.

39. A vehicle as set forth in claim 37, wherein the tailgate is generally vertical in its closed position and generally horizontal in its open position.

40. A vehicle as set forth in claim 37, wherein the tailgate is mounted on the supporting structure by a hinge connecting a bottom of the tailgate to the supporting structure.

41. A vehicle as set forth in claim 37, wherein the tailgate is releasably secured to the supporting structure for removal of the tailgate from the vehicle.

42. A vehicle as set forth in claim 37, wherein rotation of the keeper causes movement of the latch from the latching position toward the non-latching position when the latching surface and keeper surface are engaged.

43. A vehicle as set forth in claim 37, wherein the keeper comprises a protrusion, and movement of the keeper from the first position toward the second position when the latching surface is engaged with the keeper surface causes the protrusion to move the latch from its latching position toward its non-latching position.

44. A vehicle as set forth in claim 37, wherein the latch is movably coupled to the supporting structure such that a moment created by a load applied to the latch by the keeper when the latch is in its latching position biases the latch against movement from the latching position toward the non-latching position.

45. A vehicle comprising:
- a tailgate mounted on a supporting structure of the vehicle for rotation about a first axis in a first direction from a closed position to an open position of the tailgate;
- a keeper pivotally mounted on the tailgate for movement with the tailgate about said first axis and for movement with respect to the tailgate, the keeper comprising a keeper surface;
- a latch having a latching surface, the latch being mounted on said vehicle supporting structure for rotation about a second axis in a second direction substantially opposite said first direction from a latching position to a non-latching position, the second axis being spaced from the first axis by a first distance and the latching surface being spaced from said second axis by a second distance, said second distance being shorter than said first distance; and
- a member rotatable between at least a first position and a second position such that rotation of the member from the first position toward the second position rotates the keeper such that, when the latching and keeper surfaces are engaged, the keeper moves the latch from the latching position toward the non-latching position;
- wherein the latching surface engages the keeper surface when the tailgate is closed and the latch is in the latching position to hold the tailgate in the closed position.

46. A vehicle as set forth in claim 45 further comprising a stop moveable between a first position in which the stop contacts the latch and thereby inhibits movement of the latch toward the non-latching position and a second position in which the stop does not interfere with movement of the latch.

47. A vehicle as set forth in claim 45 wherein the tailgate is generally vertical in its closed position and generally horizontal in its open position.

48. A vehicle as set forth in claim 45, wherein the tailgate is mounted on the supporting structure by a hinge connecting a bottom of the tailgate to the supporting structure.

49. A vehicle as set forth in claim 45, wherein the tailgate is releasably secured to the support structure for removal of the tailgate from the vehicle.

50. A vehicle as set forth in claim 45, wherein the keeper includes a protrusion, and the keeper is movable between at least a first position and a second position, such that when the latching and keeper surfaces are engaged, movement of the keeper from the first position toward the second position causes the protrusion to contact the latch thereby causing movement of the latch from the latching position toward the non-latching position.

51. A vehicle as set forth in claim 45, wherein the latch is movably coupled to the supporting structure such that a moment created by a load applied to the latch by the keeper when the latch is in its latching position biases the latch against movement from the latching position toward the non-latching position.

* * * * *